July 9, 1963
A. H. MILLER
3,096,870
FRUIT PREPARATION MACHINE
Filed Feb. 15, 1962
4 Sheets-Sheet 1
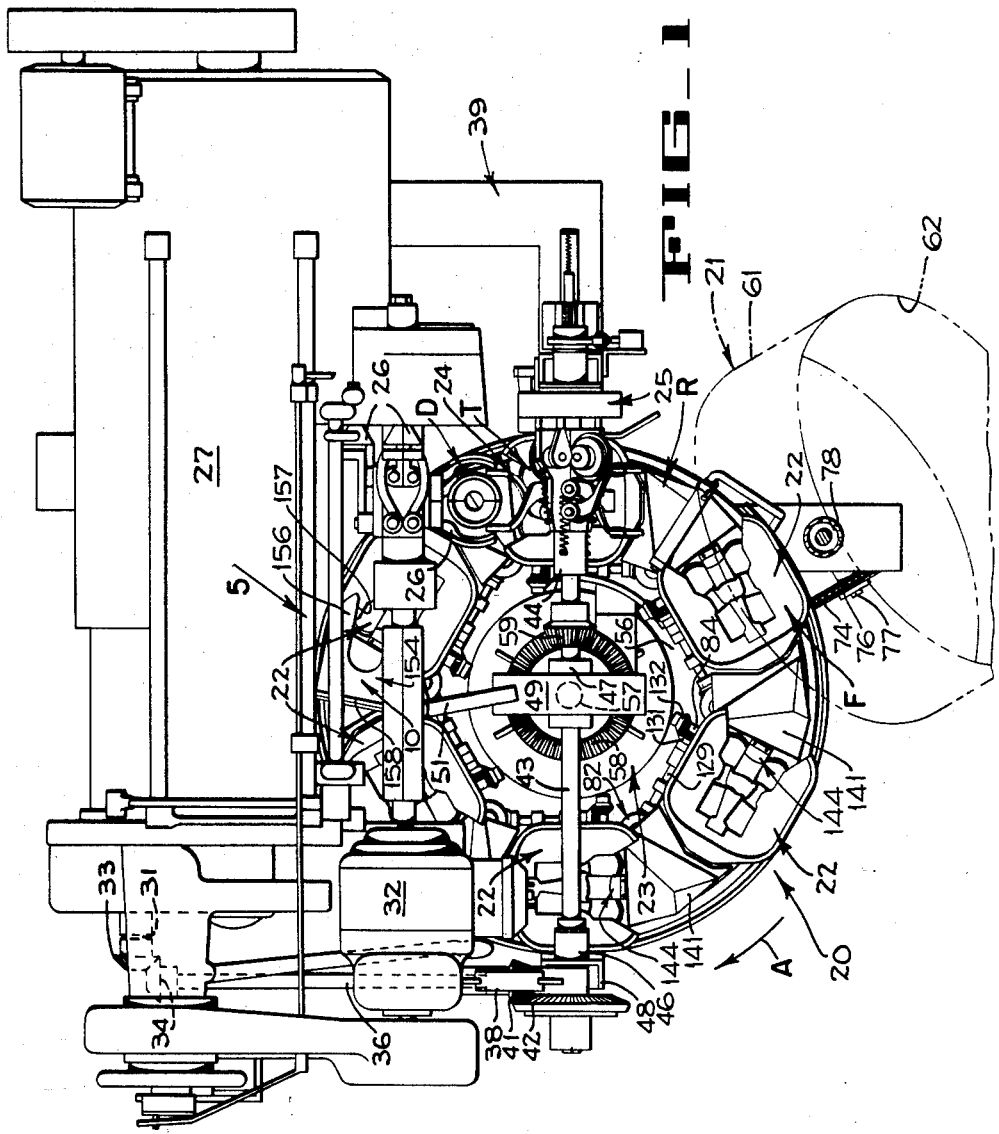
FIG_1
INVENTOR
ANDREW H. MILLER
BY *Hans G. Hoffmeister*
ATTORNEY July 9, 1963
A. H. MILLER
3,096,870
FRUIT PREPARATION MACHINE
Filed Feb. 15, 1962
4 Sheets—Sheet 2
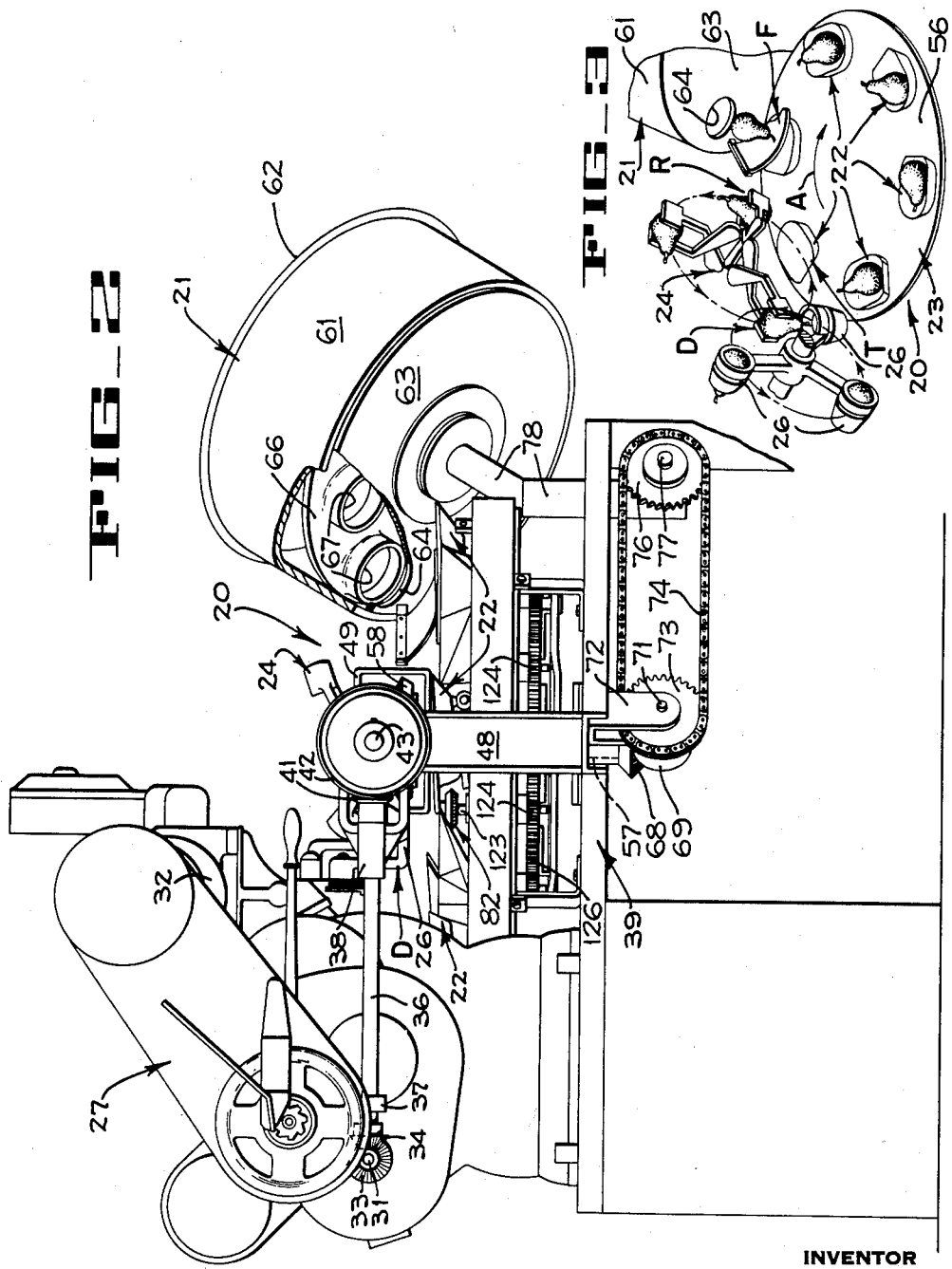
INVENTOR
ANDREW H. MILLER
BY *Hans G. Hoffmeister*
ATTORNEY

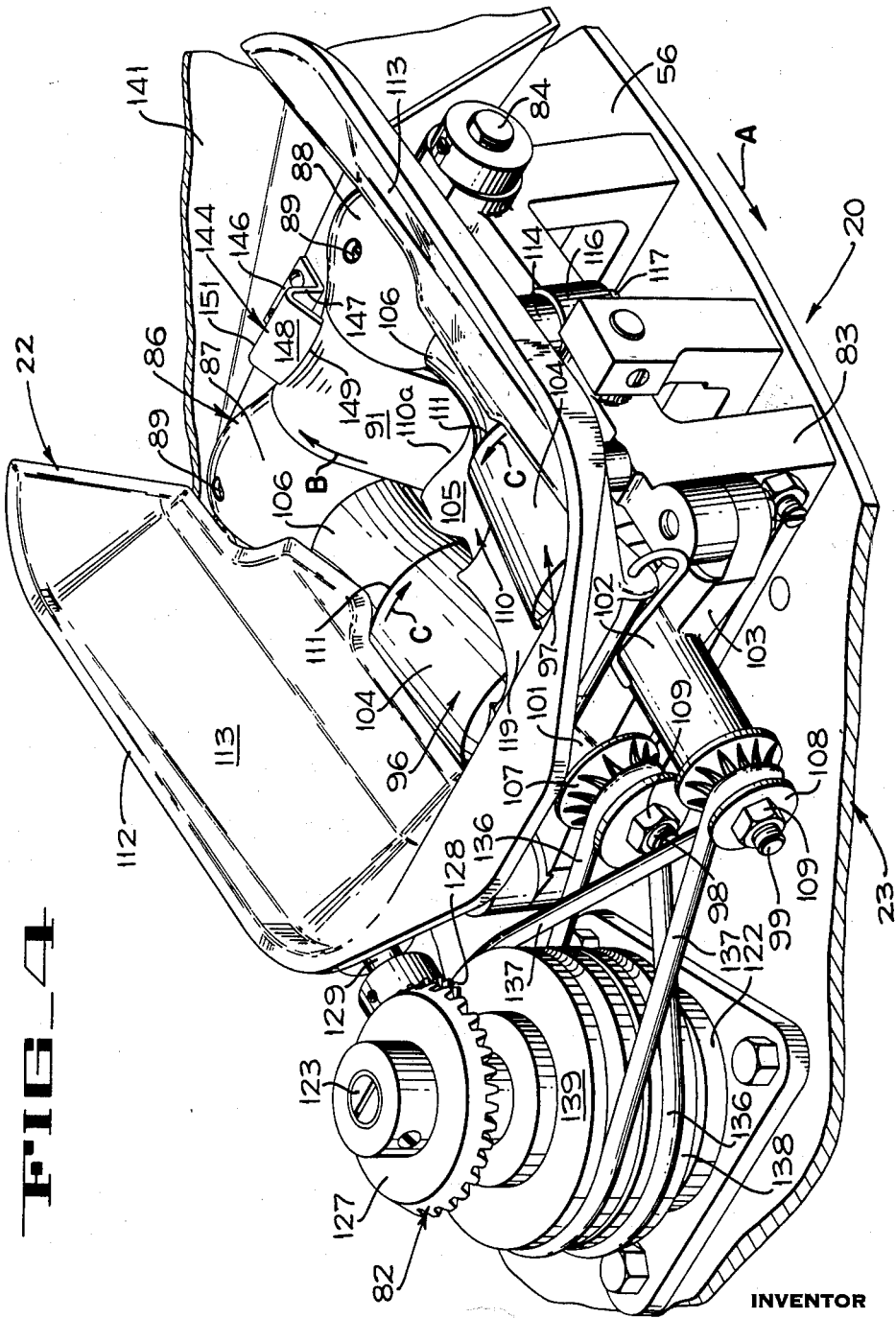

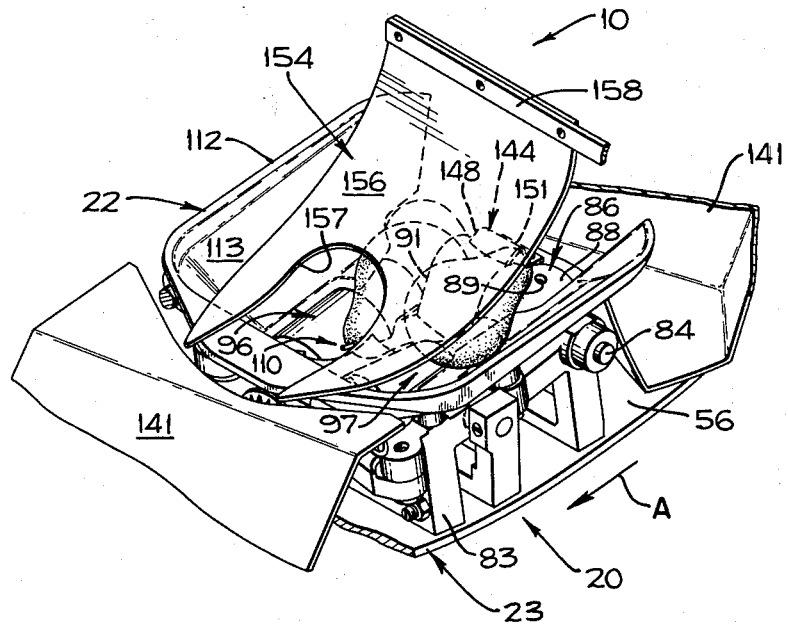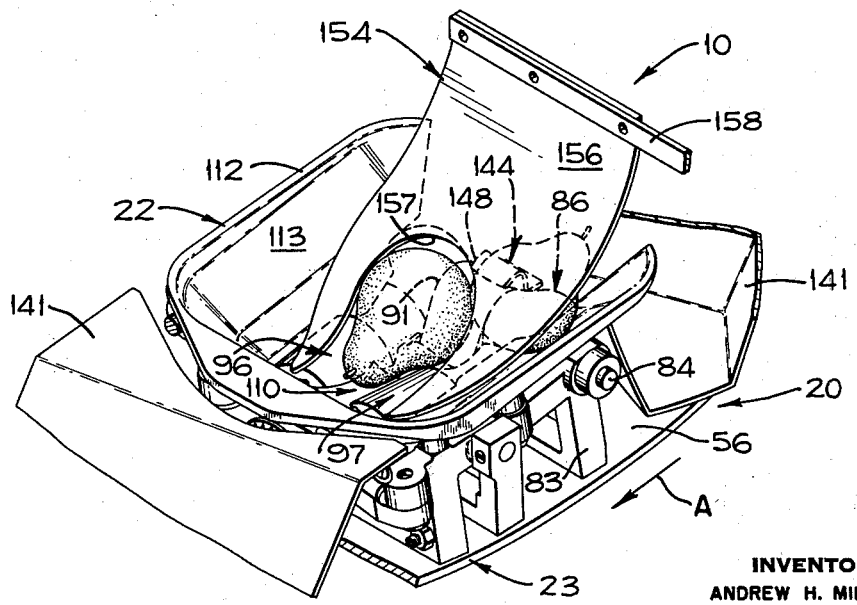

United States Patent Office 3,096,870
Patented July 9, 1963

3,096,870
FRUIT PREPARATION MACHINE
Andrew H. Miller, Los Gatos, Calif., assignor to FMC Corporation, San Jose, Calif., a corporation of Delaware
Filed Feb. 15, 1962, Ser. No. 173,489
6 Claims. (Cl. 198—33)

The present invention pertains to fruit preparation machines and more particularly relates to an arresting and wiping apparatus for maintaining a single fruit in a fruit orienting mechanism during the orienting operation.

In pear orienting and feeding apparatus of the type disclosed in the pending application of Chamberlin, Serial No. 144,153, which is assigned to the assignee of the present invention, orienting mechanisms with open ends are provided for orienting one pear at a time. The oriented pears are then transferred from the mechanisms and placed individually into cups of a pear preparation machine for further processing. Occasionally, more than one pear at a time is inadvertently fed into an orienting mechanism and the presence of two pears in a carrier may foul the mechanism for transferring the pear from the carrier.

Also, certain pears which are unusually long and do not have the usual prominent bulbous end portion but are somewhat banana-shaped, are sometimes inadvertently discharged from the open end of the associated orienting mechanism prior to reaching the transfer mechanism.

It is, therefore, one object of the present invention to provide apparatus for maintaining a single fruit in a fruit orienting mechanism during the orienting operation.

Another object is to provide apparatus for removing all fruit except one from a fruit orienting mechanism.

Another object is to provide a flexible wiper for deflecting all but an oriented fruit from a fruit orienting mechanism.

Another object is to provide a stop for arresting the premature movement of a pear out of an orienting mechanism.

These and other objects and advantages of the present invention will become apparent from the following description and the accompanying drawings, in which:

FIG. 1 is a plan of a pear preparation machine coupled to a pear orienting and feeding apparatus having the fruit arresting and wiping apparatus of the present invention associated therewith, certain parts being shown in phantom.

FIG. 2 is an elevation of the left end of the machine of FIGURE 1, certain parts being broken away.

FIG. 3 is a diagrammatic perspective showing the cooperative relationship between certain rotary parts of the orienting and feeding apparatus and certain parts of the pear preparation machine.

FIG. 4 is an enlarged perspective showing one of the pear orienting mechanisms.

FIGS. 5 and 6 are operational views looking in the direction of the arrow 5 in FIG. 1 showing the manner in which the arresting and wiping apparatus removes one unoriented pear from an orienting mechanism while maintaining an oriented pear therein.

The fruit arresting and wiping apparatus 10 (FIGS. 5 and 6) of the present invention is associated with a pear orienting and feeding apparatus 20 (FIGS. 1, 2 and 3) which receives pears at a feed station F from a well known pear feeder 21 which deposits pears one at a time into a plurality of equally spaced orienting mechanisms 22. The orienting mechanisms 22 are mounted on a carrier or turret 23 which is continuously driven in the direction of the arrow A in FIGURES 1 and 3. As the turret moves in a circular path in the direction of arrow A, each pear in its respective orienting mechanism 22 is oriented so that the stem end is foremost and the stem blossom axis is tangent to the circular path of movement of the pear. After the pear is oriented, it is carried to a transfer station T (FIG. 3) where a transfer mechanism 24 grips each pear independently and removes it from its orienting mechanism 22. The transfer mechanism 24 cooperates with a reject mechanism 25 (FIG. 1) and carries the oriented pears past a reject station R. All unoriented pears are discharged from the transfer mechanism at the reject station R, and the remaining properly oriented pears are carried backwardly by the transfer mechanism to a discharge station D. Each oriented pear is released from the transfer mechanism 24 and is deposited stem end down into one of three fruit supporting cups 26 (FIG. 3) of a pear preparation machine 27 of well known design, which machine peels, cores and performs other desired operations on the pears. The cups 26 are intermittently driven and, during operation, are stopped one by one at the discharge station D of the transfer mechanism.

The pear preparation machine 27 may be of the type disclosed in the United States Letters Patent No. 2,905,216 which issued to M. E. C. Freeman et al. on September 22, 1959. Also, the construction and operation of the feeding apparatus 21, the orienting apparatus 20, the driving apparatus, and the associated mechanisms are described in the afore-mentioned Chamberlin application Serial No. 144,153. Reference may be had to said Freeman et al. patent and said Chamberlin application for the details of any structure not discussed in detail hereinafter.

The drive for the turret 23, the transfer mechanism 24 and the pear feeder 21 includes a shaft 31 (FIGS. 1 and 2) of the pear preparation machine 27 which is continuously driven by the motor 32 by internal drive parts (not shown). A bevel gear 33, keyed to the shaft 31, drives a bevel gear 34 which is keyed to one end of a shaft 36. The shaft 36 is suitably journalled in brackets 37 and 38 which are secured to the machine 27 and to a rigid support frame 39 of the orienting and feeding apparatus 20, respectively.

A bevel gear 41 is keyed to the other end of the shaft 36 and meshes with a large diameter bevel gear 42 which is secured to one end of a shaft 43 which extends radially of the turret 23, as best shown in FIG. 1. The shaft 43 has one end journalled in a bearing 46, and an intermediate portion journalled in a central block 47. The other end of the shaft 43 is received in and is secured to a hub 44 of the transfer mechanism 24. The bearing 46 is secured to the upper end of a vertically extending channel 48 of the frame 39, and the block 47 is bolted to a looped support bracket 49 (FIGS. 1 and 2) which is secured to a fixed member of the pear preparation machine 27 by a strap 51.

The turret 23 includes a large diameter disc 56 which is secured to a vertically extending turret shaft 57 (FIG. 2) journalled in the frame 39. A bevel gear 58 is keyed to the upper end of the shaft 57 and meshes with a bevel gear 59 that is keyed to the shaft 43. Thus, rotation of the shaft 43 causes rotation of the turret 23 through the gears 58 and 59.

The pear feeder 21 (FIG. 2) comprises a stationary inclined cylinder 61 having an open inlet end 62 and an inclined floor 63 which has a single discharge opening 64 near its upper end. A false floor 66, having a plurality of tubular fruit receiving pockets 67 formed adjacent its periphery, is mounted for rotation within the cylinder 61. The false floor 66 is driven from a bevel gear 68 keyed to the lower end of the turret shaft 57 that is in driving engagement with a bevel gear 69. The bevel gear 69 is keyed to a shaft 71 that is journalled in a yoke 72 secured to the frame 39. A drive sprocket 73 keyed to the shaft 71 is connected by a chain 74 to a driven sprocket 76 which is keyed to a stub shaft 77. The stub shaft 77 is journalled in a stationary tubular housing 78 which is secured to the frame 39 and to the floor 63 to support the pear feeder 21 in its inclined position. Certain drive parts (not shown) are positioned within the tubular housing 78 and connect the stub shaft 77 in driving engagement with the false floor 66.

Rotation of the false floor 66 causes pears, which are fed into the cylinder 61 in bulk from a conveyor (not shown) to be individually picked up in the pockets 67. The pockets carry the pears upwardly until they reach the discharge opening 64 at which time the pear falls through the opening 64 into one of the orienting mechanisms 22 therebelow.

It will be understood that the above drive mechanisms for the turret 23, the pear feeder 21, the transfer mechanism 24, and the fruit supporting cups 26 are timed so that one of the fruit receiving pockets 67 registers with the opening 64 when one of the orienting mechanisms 22 is in position to receive a pear from the feeder 21. Also, the movement of the orienting mechanism 22 and the fruit supporting cups 26 are timed with the movement of the transfer mechanism 24 so that the mechanism 24 can effect a transfer of the oriented pear from each of the orienting mechanisms 22 to the cups 26.

Six equally spaced orienting mechanisms 22 (FIG. 1) are provided and are bolted to the turret disc 56, and each mechanism 22 has a transmission 82 associated therewith that is likewise bolted to the disc 56. Since all the orienting mechanisms 22 and their transmissions are identical, the description of one of each of these units will suffice for all.

Each orienting mechanism 22 (FIG. 4) comprises a frame 83 which rotatably supports a transversely extending rear orienting roller shaft 84. A rear roller 86 is constructed in two halves comprising two identical spaced bulbous end portions 87 and 88 of generally truncated spherical form, and two inner end portions which define a cylindrical belt drive roller (not shown). The two halves of the rear roller 86 are secured to the shaft 84 by set screws 89. An upwardly and rearwardly inclined orienting belt 91, of concave transverse section, is trained around the inner portions of the rear roller 86 and around an idler roller (not shown) which is journalled in the frame 83.

Two side orienting rollers 96 and 97 are mounted on shafts 98 and 99, respectively, which are journalled in elongated bushings 101 and 102, respectively. The bushings 101 and 102, are formed as an integral part of a bracket 103 which extends transversely across and is bolted to the forward end of the frame 83. The axes of the shafts 98 and 99 converge toward the forward end of the orienting mechanism 22 and are inclined forwardly and downwardly from the rear shaft 84. Each side roller 96 and 97 includes a frusto-conical forward portion 104 and a concave rear portion 106 which conforms to the shape of the blossom end of an average pear. The side edges of a bridge 105, which is supported on the frame 83, conform to the shape of the rear portions of the rollers 96 and 97 and lie closely adjacent thereto. The rear edge of the bridge 105 lies closely adjacent the orienting belt 91. The end faces of the rearward ends of the side rollers 96 and 97 are concave so as to permit a portion of the bulbous ends 87 and 88, respectively, of the rear roller 86 to pass therethrough. In this way, the clearance between the ends of the rollers 96 and 97 and the bulbous ends 87 and 88 is reduced to a minimum. The forward ends of the shafts 98 and 99 are shouldered and threaded to receive pulleys 107 and 108, respectively, said pulleys being locked in place on the shafts by nuts 109.

An aligning cavity 110 is formed between the rollers 96 and 97 and the slope of the roller portions 104 and the angle of divergence of the rollers is such that the fruit will be drawn into the aligning cavity 110 upon rotation of the rollers and belt 91 in the directions indicated by the arrows B and C. The concave roller portions 106 are so curved relative to the frusto-conical roller portions 104 that an annular ridge 111 is formed between the two portions of each roller, and a generally spherical fruit receiving chamber 110a is defined by the two roller portions 106 and the belt 91.

The orienting mechanism 22 also includes a fruit-receiving U-shaped dish 112 which is contoured to aid feeding and to permit freedom of fruit movement during the orienting operation. Each side wall 113 of the dish 112 is provided with a downwardly projecting threaded boss 114 (only one being shown in FIG. 4) which rests on and is secured to an apertured boss 116 of the frame 83 by a cap screw 117. The rear of the dish 112 is open for reasons which will be explained presently. The bottom of the dish is also open to expose the rollers and belt, and the side walls 113 are shaped to deflect the pear inwardly toward the aligning cavity 110.

A nose stop 119 is mounted between the frusto-conical forward portions 104 of the side rollers 96 and 97 and supports the nose of an aligned pear.

The rear orienting roller 86 and the orienting belt 91 are continuously driven in the direction of the arrow B, and the side orienting rollers 96 and 97 are driven, either together or separately, in the directions of the arrows C by the transmission 82. The transmission 82 includes a flanged bearing housing 122 within which is journalled a vertically extending shaft 123. A pinion 124 (FIG. 2) is keyed to the lower end of the shaft 123 and meshes with a large diameter gear 126 which is fixed to the frame 39 and is concentric with the axis of the turret 23. A bevel gear 127 (FIG. 4) secured to the upper end of the shaft 123 drives a gear 128 which is secured to a shaft 129. The shaft 129 (FIG. 1) is journalled in the frame 83 of the orienting mechanism 22 and is connected in driving engagement to the rear orienting roller shaft 84 by bevel gears 131 and 132. Thus, rotation of the turret 23 will cause continuous rotation of the rear orienting roller 86 (FIG. 4) and belt 91 in the direction of the arrow B.

The side orienting rollers 96 and 97 (FIG. 4) are driven by belts 136 and 137. The belt 136 is trained around the pulley 107 and around a drive sheave 138 of the transmission 82. Similarly, the belt 137 is trained around the pulley 108 and around a drive sheave 139 of the transmission. Certain internal parts (not shown) of the transmission 82 are arranged either to simultaneously connect both sheaves 138 and 139 to the shaft 123 or to connect one sheave at a time to the shaft 123. Accordingly, the side orienting rollers 96 and 97 are driven either together or separately in the direction of the arrows C by the transmission 82.

The rotation of the orienting rollers 86, 96 and 97 and the movement of the orienting belt 91 causes a normally shaped pear in the orienting mechanism 22 to be shifted and rotated until the pear becomes aligned in the cavity 110 with its stem end foremost and its bulbous blossom end received in the spherical chamber 110a. Discharge chutes 141 (FIGS. 5 and 6) are disposed between each of the orienting mechanisms 22 and act to guide pears received therein outwardly of the turret 23.

The portion of the pear orienting and feeding apparatus 20 thus far described is the same as that disclosed in the aforementioned Chamberlin application and is believed to be sufficient for an understanding of the operation of the fruit arresting and wiping apparatus 10 of the present invention.

As mentioned previously, long, thin pears which do not have the usual bulbous ends are sometimes inadvertently moved out of the dish 112 over the belt 91 or over the rear roller 86. This occurs because long, thin pears contact the belt 91 at a higher point than do the bulbous ends of normally formed pears which enter the spherical chamber 110a. In order to prevent the inadvertent discharge of a long, thin pear from its associated orienting mechanism 22, an arresting unit 144 (FIG. 4) of the fruit arresting and wiping apparatus 10 of the present invention is secured to the rearward chute 141 immediately rearward of the belt 91.

The arresting unit 144 is preferably of one-piece construction and includes a horizontal mounting section 146, a forwardly and upwardly inclined intermediate section 147, and a forwardly and downwardly inclined abutment section 148. The foremost edge 149 of the abutment section 148 conforms closely to the curvature of the belt 91 and is positioned immediately adjacent the belt 91 at a point slightly rearward of a vertical plane extending through the axis rotation of the rear orienting roller 84. The uppermost edge 151 of the abutment section 148 projects above the belt 91 and accordingly will cam upwardly any pear which the belt 91 tends to move rearwardly past the arresting unit. Thus, frictional engagement between the belt 91 and such a pear is minimized and rearward movement of the pear is terminated. In this way, thin, elongated pears are maintained in the associated orienting mechanism.

Although the pear feeder 21 (FIG. 2) is intended to discharge only one pear at a time into each of the orienting mechanisms 22, occasionally two pears are inadvertently fed into one of the mechanisms. The fruit arresting and wiping apparatus 10 (FIGS. 5 and 6) of the present invention is provided for the purpose of sweeping the unoriented pear from the associated orienting mechanism which contains two pears, while leaving an oriented pear undisturbed in its oriented position in the mechanism 22.

The fruit arresting and wiping apparatus 10 includes the arresting unit 144 and a flexible wiper 154. The flexible wiper 154 comprises a flap 156 of flexible material such as rubber having an inverted U-shaped lower end which defines an opening 157. The flap is secured to a bracket 158, which bracket 158 is secured to the frame of the pear orienting and feeding apparatus 20 as shown in FIG. 1 so that the flap 156 is contacted by the orienting mechanisms as they move therepast.

In operation of the fruit arresting and wiping apparatus 10 (FIGS. 5 and 6) of the present invention, the orienting mechanisms 22 are driven past the wiper 154 in the direction of the arrow A. As each orienting mechanism 22 having two pears therein passes the wiper 154, the wiper 154 engages and moves rearwardly any pear which is not centered in the aligning cavity 110. The centered pear in the aligning cavity, whether aligned or not, passes through the opening 157 in the wiper 154 and remains in the cavity 110. If the centered pear in the cavity 110 is urged rearwardly by engagement either with the wiper 154 or with the other pear in the orienting mechanism 22, the abutment section 148 of the arresting unit 144 will engage the centered pear and will prevent further rearward movement of the center pear. The orienting mechanism 22 will then move out of engagement with the centered pear allowing the mechanism 22 to orient this pear if it is not already oriented. During this time, the other, or non-centered, pear is contacted by the wiper 154 which forces the pear against the upper surfaces of the continuously rotating rear roller 86. The rear roller 86 then cooperates with the wiper to move the pear rearwardly out of the orienting mechanism 22 and into the associated chute 141 for subsequent discharge from the pear orienting and feeding apparatus 20.

It will be understood that in many cases the centered pear will also be oriented and will not be contacted by the wiper 154 or be moved rearwardly by the non-centered pear. Under such conditions, the arresting unit 144 is ineffective when the non-centered pear is discharged from the orienting mechanism 22.

From the foregoing description it will become apparent that the fruit arresting and wiping apparatus of the present invention includes an arresting unit which prevents the inadvertent discharge of pears, especially long, thin pears, from an orienting mechanism. The apparatus also includes a wiper which cooperates with the continuously rotating rear orienting roller and with the arresting unit to discharge a non-centered pear from the orienting mechanism while maintaining a centered pear in the mechanism.

While one embodiment of the present invention has been shown and described, it will be understood that various changes and modifications may be made without departing from the spirit of the invention or the scope of the appended claims.

The invention having thus been described, what is believed to be new and desired to be protected by Letters Patent is:

1. In a pear orienting and feeding apparatus, an orienting mechanism, a plurality of pear engaging means in said orienting mechanism adapted to support a pear, means connected to said pear engaging means for driving said means in directions which will cause the pear to become oriented with its stem blossom axis disposed in a predetermined position, one of said pear engaging means being driven in a direction which tends to move the pear out of said orienting mechanism along a predetermined path, and an arresting unit disposed in said predetermined path and having an abutment section for contacting and camming upwardly any pear which tends to be driven out of said orienting mechanism by said one pear engaging means whereby the frictional engagement between the pear and said one pear engaging means is reduced and the movement of said pear outwardly of said orienting mechanism is terminated.

2. In a pear orienting and feeding apparatus, an orienting mechanism, a plurality of rollers journalled in triangular configuration in said orienting mechanism, an upwardly inclined belt trained around one of said rollers and defining with said rollers a pear receiving cavity, means connected to said one roller for continuously driving said one roller and said belt in a direction which tends to move a pear out of said cavity along a predetermined path, and an arresting unit disposed in said predetermined path and having an abutment section for contacting and camming upwardly any pear which tends to be driven out of said cavity by said belt whereby the frictional engagement between the pear and said belt is reduced and the movement of said pear outwardly of said cavity is terminated.

3. In a pear orienting and feeding apparatus, an orienting mechanism movable along a predetermined path, a plurality of pear engaging means in said orienting mechanism adapted to support two pears, means connected to said pear engaging means for driving said means in directions which will cause one of the pears to become centered relative to said predetermined path, one of said pear engaging means being driven in a direction which tends to move pears out of said orienting mechanism along said predetermined path in a direction opposite to the direction of movement of said orienting mechanism, and an inverted U-shaped, flexible flap having an opening therein and being supported in position to wipe over said orienting mechanism as said mechanism moves along said path with the one centered pear arranged to pass through said opening, said flap being adapted to engage the other pear and force said other pear against said one pear engaging means whereby said flap and said one pear engaging means cooperate to drive said other pear from said orienting mechanism.

4. In a pear orienting and feeding apparatus, an orienting mechanism movable along a predetermined path, a plurality of rollers journalled in triangular configuration in said orienting mechanism and arranged to support two pears, an upwardly inclined belt trained around one of said rollers and defining with said rollers a pear receiving cavity, means connected to said one roller for continuously driving said one roller and said belt in a direction which tends to move a pear centered in said cavity out of said cavity along said predetermined path, and an inverted U-shaped, flexible flap having an opening therein and being supported in position to wipe over said orienting mechanism as said orienting mechanism moves along said path with the one centered pear passing through said opening, said flap being adapted to engage the other pear and force said other pear against said one roller whereby said flap and said one roller cooperate to drive said other pear from said orienting mechanism.

5. In a pear orienting and feeding apparatus, an orienting mechanism movable along a predetermined path, a plurality of pear engaging means in said orienting mechanism adapted to support two pears, means connected to said pear engaging means for driving said means in directions which will cause one of the pears to become centered relative to said predetermined path, one of said pear engaging means extending transversely of said path and being driven in a direction which tends to move pears out of said orienting mechanism along said predetermined path in a direction opposite to the direction of movement of said orienting mechanism, an arresting unit movable with said orienting mechanism and disposed in said predetermined path, said arresting unit having an abutment section disposed adjacent said one pear engaging means and extending transversely of said path a distance less than that of said one pear engaging means for contacting and camming upwardly a centered pear which tends to be driven out of said orienting mechanism by said one pear engaging means whereby the frictional engagement between said one pear engaging means and said one pear is reduced and the movement of said centered pear outwardly of said orienting mechanism is terminated, and an inverted U-shaped flexible flap having an opening therein and being supported in position to wipe over said orienting mechanism as said mechanism moves along said path with said centered pear arranged to pass through said opening, said flap adapted to engage the other pear and force said other pear against said one pear engaging means whereby said flap and said one pear engaging means cooperate to drive said other pear from said orienting mechanism.

6. In a pear orienting and feeding apparatus, an orienting mechanism movable along a predetermined path, a plurality of rollers journalled in triangular configuration in said orienting mechanism and arranged to support two pears, an upwardly inclined belt trained around the center of one of said rollers and defining with said rollers a pear receiving cavity, said belt and said one roller extending transversely of said predetermined path, means connected to said one roller for continuously driving said one roller and said belt in a direction which tends to move a pear centered in said cavity out of said cavity along said predetermined path, an arresting unit movable with said orienting mechanism and disposed in said predetermined path, said arresting unit having an abutment section disposed adjacent and transversely centered relative to said belt and extending transversely of said path a distance less than that of said one roller for contacting and camming upwardly a centered pear which tends to be driven out of said cavity along said predetermined path by said belt whereby the frictional engagement between the centered pear and said belt is reduced and the movement of the centered pear outwardly of said cavity is terminated, and an inverted U-shaped flexible flap having an opening therein and being supported in position to wipe over said orienting mechanism as said mechanism moves along said path with said centered pear arranged to pass through said opening, said flap arranged to engage the other pear and force said other pear against said one roller whereby said flap and said one roller cooperate to drive said other pear from said orienting mechanism.

No references cited.